(12) United States Patent
Fanfani

(10) Patent No.: US 12,524,684 B2
(45) Date of Patent: Jan. 13, 2026

(54) SYSTEMS AND METHODS FOR REAL-TIME DIGITAL VIDEO PIRACY MONITORING

(71) Applicant: Discovery.com, LLC, New York, NY (US)

(72) Inventor: Andrea Fanfani, London (GB)

(73) Assignee: Discovery.com, LLC, New York, NY (US)

( * ) Notice: Subject to any disclaimer, the term of this patent is extended or adjusted under 35 U.S.C. 154(b) by 126 days.

(21) Appl. No.: 18/300,149

(22) Filed: Apr. 13, 2023

(65) Prior Publication Data

US 2024/0346336 A1    Oct. 17, 2024

(51) Int. Cl.
*H04L 9/40* (2022.01)
*G06N 5/022* (2023.01)
*G06F 21/10* (2013.01)
*G06F 21/16* (2013.01)

(52) U.S. Cl.
CPC ......... *G06N 5/022* (2013.01); *G06F 21/1014* (2023.08); *G06F 21/16* (2013.01); *H04L 63/1425* (2013.01)

(58) Field of Classification Search
CPC ............. H04L 63/102; H04L 2209/606; H04L 63/1425; G06F 16/2358; G06F 21/1014; G06F 21/16; G06F 21/10; H04N 21/44236; H04N 21/2585
See application file for complete search history.

(56) References Cited

U.S. PATENT DOCUMENTS

| | | | |
|---|---|---|---|
| 10,334,060 B1* | 6/2019 | Weldon | H04L 63/1425 |
| 2011/0225608 A1* | 9/2011 | Lopatecki | H04N 21/2668 |
| | | | 725/34 |
| 2014/0122217 A1 | 5/2014 | Hills et al. | |
| 2014/0189067 A1* | 7/2014 | Gratton | H04L 63/107 |
| | | | 709/219 |
| 2015/0207708 A1 | 7/2015 | Raleigh et al. | |
| 2016/0149956 A1* | 5/2016 | Birnbaum | H04L 63/101 |
| | | | 726/1 |

(Continued)

OTHER PUBLICATIONS

International Search Report issued in International Application No. PCT/US2024/024289 dated Jul. 12, 2024 (16 pages).

*Primary Examiner* — David J Pearson
(74) *Attorney, Agent, or Firm* — Bookoff McAndrews, PLLC

(57) ABSTRACT

Systems and methods for performing video piracy monitoring are disclosed. One computer-implemented method may include: detecting, at a digital media platform associated with a piracy monitoring system, a request to transmit a video stream to a user computing device associated with a user; transmitting the video stream to the user computing device and responsive to determining that the user is a subscriber to the digital media platform; retrieving activity data associated with the video stream using a content delivery network (CDN) associated with the piracy monitoring system; providing, responsive to the retrieving, the activity data to a trained machine-learning model configured to recognize a video piracy pattern; and performing a mitigating action to address piracy of the video stream responsive to receiving an output result from the trained machine-learning model indicating that the activity log data shares a predetermined level of similarity with the video piracy pattern.

20 Claims, 4 Drawing Sheets

(56) References Cited

U.S. PATENT DOCUMENTS

| | | | |
|---|---|---|---|
| 2019/0261222 A1* | 8/2019 | Raleigh | H04W 28/10 |
| 2019/0286726 A1 | 9/2019 | Labian | |
| 2020/0184043 A1* | 6/2020 | Li | G06V 10/772 |
| 2022/0358762 A1* | 11/2022 | Ellis | G06V 20/46 |
| 2023/0007023 A1* | 1/2023 | Andrabi | H04L 63/1425 |
| 2023/0007932 A1 | 1/2023 | Siddiqui et al. | |
| 2025/0211836 A1* | 6/2025 | Yoo | H04N 21/4394 |

\* cited by examiner

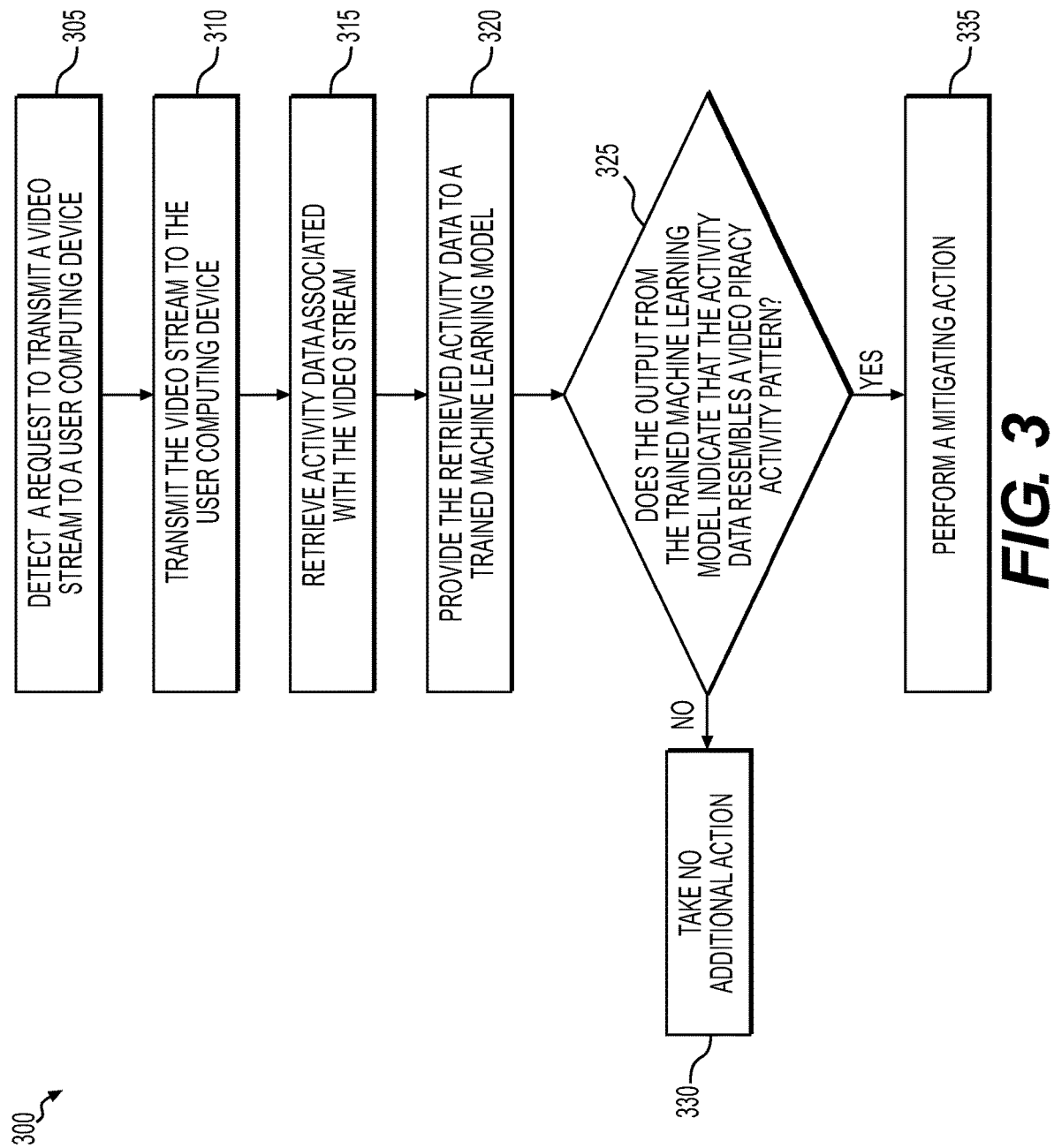

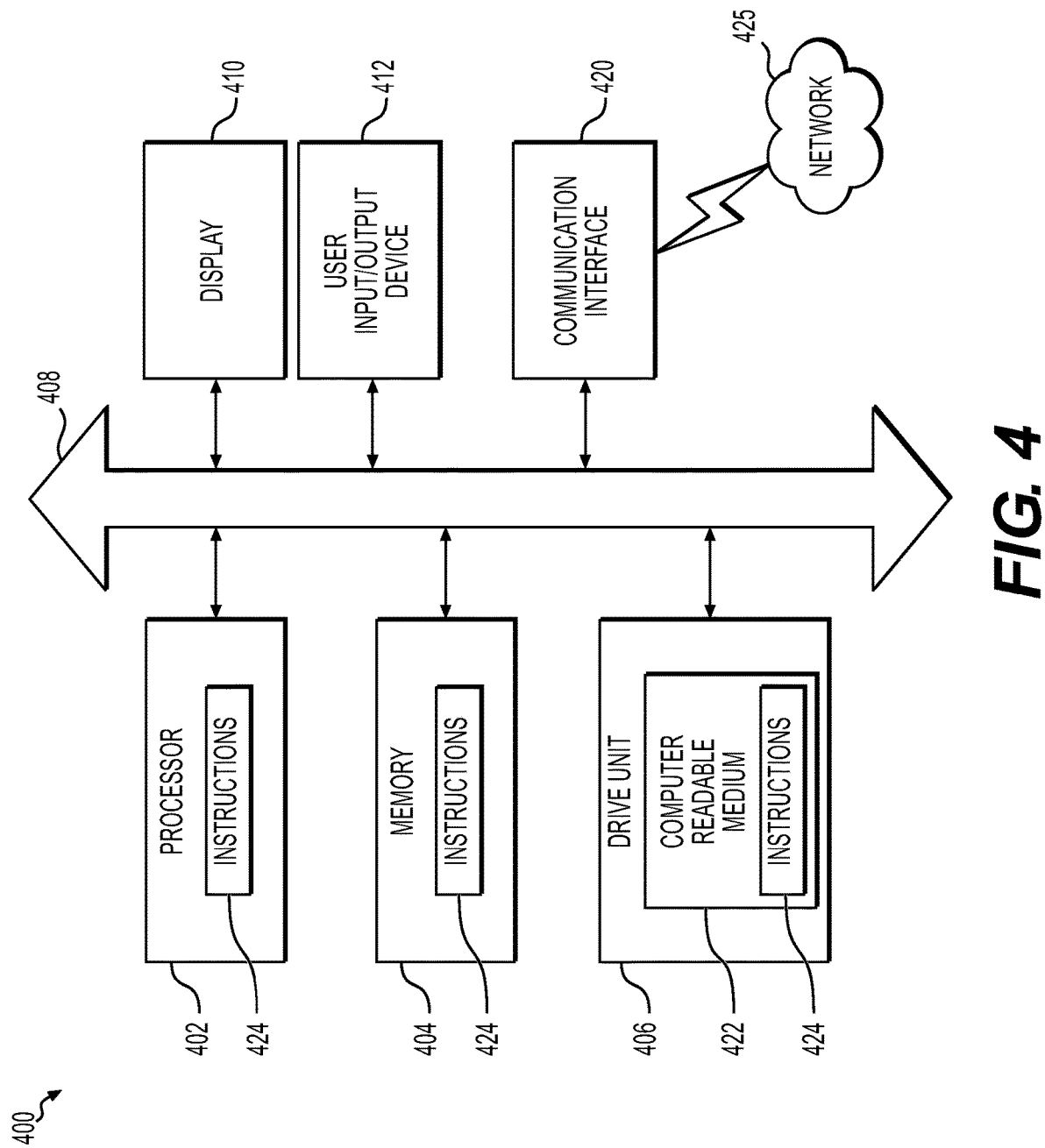

SYSTEMS AND METHODS FOR REAL-TIME DIGITAL VIDEO PIRACY MONITORING

TECHNICAL FIELD

Various embodiments of the present disclosure relate generally to the field of piracy monitoring, and, more particularly, to systems and methods that leverage machine-learning techniques to identify and mitigate piracy of streaming digital media.

BACKGROUND

Despite its illegality in many countries, online piracy of digital media (i.e., the practice of downloading and distributing copyrighted works digitally without permission) is still widely practiced around the world. Exemplary types of digital media that are frequently downloaded and/or shared without permission include music, movies, video games, and/or live broadcasts (e.g., broadcasts of sporting events, news reels, concert performances, etc.). This activity may have an adverse economic impact on the affected businesses and may also create security risks to consumers (e.g., in the form of ID theft, etc.). Although solutions have been implemented to address and limit online piracy events, these safeguards are not always effective. The present disclosure is accordingly directed to systems and methods that identify piracy events in real-time and perform actions to mitigate those actions.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for monitoring user streaming activity, determining whether the user streaming activity is indicative of piracy, and performing one or more mitigating actions to address the piracy.

In one aspect, a computer-implemented method of performing digital media monitoring is disclosed. The computer-implemented method comprising operations including: detecting, at a digital media platform associated with a piracy monitoring system, a request to transmit a video stream to a user computing device associated with a user; transmitting the video stream to the user computing device and responsive to determining that the user is a subscriber to the digital media platform; retrieving activity data associated with the video stream using a content delivery network (CDN) associated with the piracy monitoring system; providing, responsive to the retrieving, the activity data to a trained machine-learning model configured to recognize a video piracy pattern; and performing a mitigating action to address piracy of the video stream, responsive to receiving an output result from the trained machine-learning model indicating that the activity log data shares a predetermined level of similarity with the video piracy pattern.

In another aspect, a computer system for performing digital media monitoring is disclosed. The computer system includes: a processor; a database; and a server in network communication with the database, the server configured to perform operations including: detecting, at a digital media platform associated with the computer system, a request to transmit a video stream to a user computing device associated with a user; transmitting the video stream to the user computing device and responsive to determining that the user is a subscriber to the digital media platform; retrieving activity data associated with the video stream using a content delivery network (CDN) associated with the computer system; providing, responsive to the retrieving, the activity data to a trained machine-learning model configured to recognize a video piracy pattern; and performing a mitigating action to address piracy of the video stream responsive to receiving an output result from the trained machine-learning model indicating that the activity log data shares a predetermined level of similarity with the video piracy pattern.

In yet another aspect, a non-transitory computer-readable medium for performing digital media piracy monitoring is disclosed. The non-transitory computer-readable medium stores computer-executable instructions which, when executed by a server in network communication with at least one database, cause the server to perform operations including: detecting, at a digital media platform associated with a piracy monitoring system, a request to transmit a video stream to a user computing device associated with a user; transmitting the video stream to the user computing device and responsive to determining that the user is a subscriber to the digital media platform; retrieving activity data associated with the video stream using a content delivery network (CDN) associated with the piracy monitoring system; providing, responsive to the retrieving, the activity data to a trained machine-learning model configured to recognize a video piracy pattern; and performing a mitigating action to address piracy of the video stream responsive to receiving an output result from the trained machine-learning model indicating that the activity log data shares a predetermined level of similarity with the video piracy pattern.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3 depicts an exemplary flowchart of a method of performing digital media piracy monitoring, according to one or more embodiments of the present disclosure.

FIG. 4 depicts an exemplary computing server, according to one or more embodiments of the present disclosure.

DETAILED DESCRIPTION OF EMBODIMENTS

Figure 1:
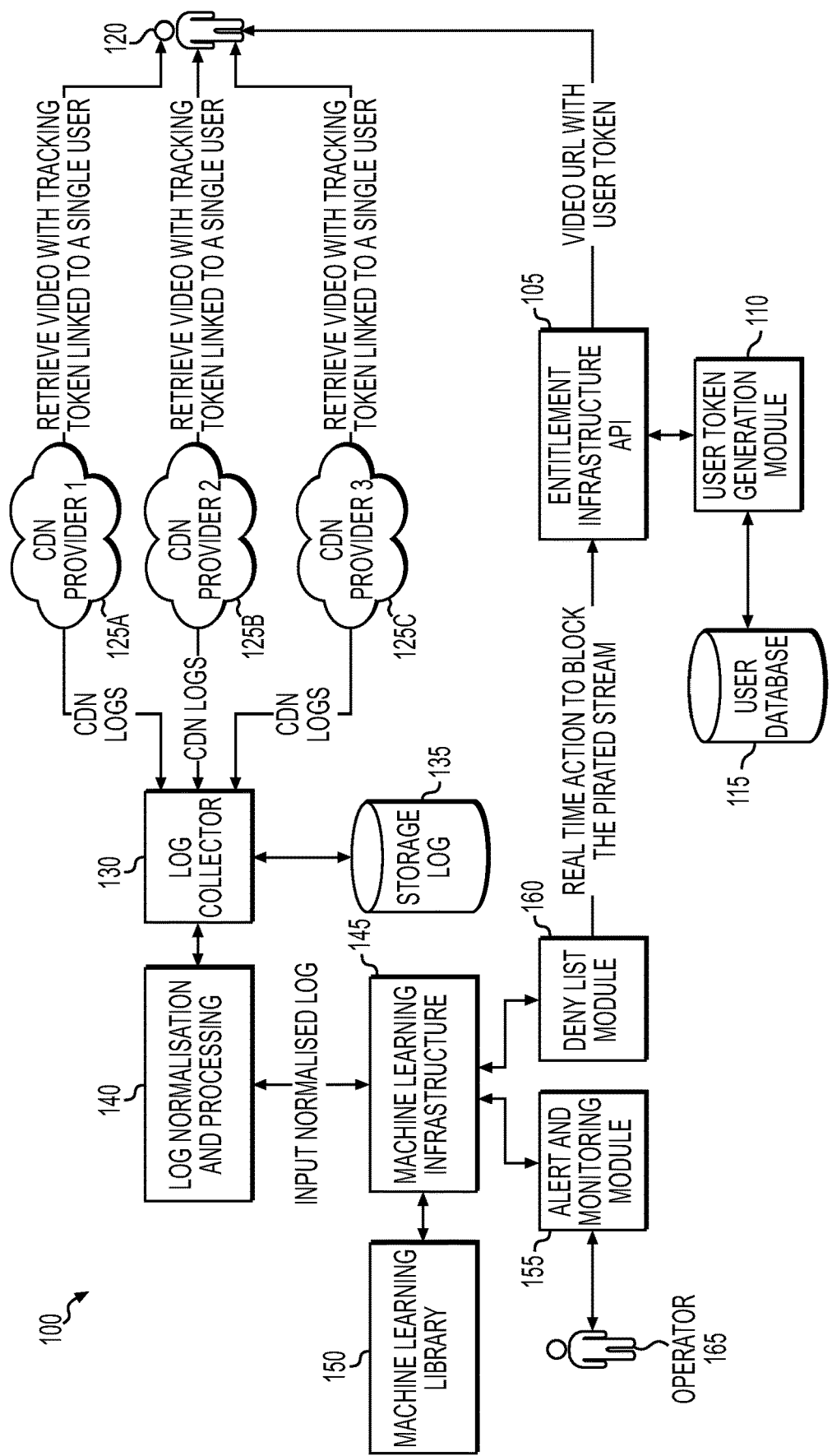
FIG. 1 depicts an exemplary system infrastructure for a digital media piracy monitoring system, according to one or more embodiments of the present disclosure.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

The term "user", "subscriber," and the like generally encompasses consumers who are subscribed to a streaming service (e.g., streaming platform) associated with the system described herein. The term "streaming service" (e.g., streaming platform) may refer to subscription-based video-on-demand (SVoD) services such as television shows, films, documentaries, and the like. The term "user" may be used interchangeably with "user profile," "profile," and the like throughout this application. The phrase "registered with" may be used interchangeably with "subscribed to" and the like throughout this application. The phrase "multimedia content" may be used interchangeably with "multimedia content item", "article of multimedia content", and the like throughout this application.

In the following description, embodiments will be described with reference to the accompanying drawings. As will be discussed in more detail below, in various embodiments, systems and methods for providing dynamic, location-based notifications to a user are described.

The unauthorized distribution, sharing, and/or modification of digital content (e.g., live streaming digital media, etc.) are covered by a variety of limitations imposed by user agreements (Terms and Conditions, click wrap agreements, etc.), third-party contractual limitations, and/or intellectual property laws, some of which may involve criminal liability. However, actually monitoring the internet to prevent each instance of impermissible and/or illegal activity may be a time-consuming and challenging task. To address these challenges, digital rights management (DRM) tools have surfaced in recent years that leverage various types of technology to control and manage access to copyrighted material. For example, DRM tools may: restrict users from editing, saving, sharing, and/or printing content, disallow users from capturing screenshots of content, establishing expiration dates for content that set temporal limits on user access, provide content access only to certain IP addresses, locations, or devices, and the like. DRM has become increasingly important as digital content spreads through peer-to-peer file exchanges, torrent sites, and online piracy.

However, conventional DRM tools are not fool-proof. For instance, bad actors may be able to circumvent and/or remove DRM safeguards and thereafter republish copyrighted content. This practice is especially prevalent in the streaming media space where live broadcasts (e.g., sporting events, etc.) may initially be appropriately obtained by a subscriber to a digital media content provider ("DMCP") but then may subsequently be illegally rebroadcast to one or more other non-subscribers. This practice may deprive a MCP and/or other entities from receiving the fees required to view their streamed content.

To address the above-noted problems, the present disclosure describes systems and methods that provide another layer of piracy protection to streamed media. More particularly, systems of the embodiments may dynamically monitor and record the streaming activity of each content consumer and thereafter determine whether the monitored activity rises to the level of likely piracy. In this regard, the monitored streaming activity may be applied to a trained machine-learning model that may analyze the activity and make a piracy likelihood determination. Responsive to receiving an indication of likely piracy, the system may take one or more mitigating actions to address the illegal action.

It can be appreciated that the systems and methods of the present disclosure provide several advantages over existing systems. For example, the trained machine-learning model may improve the time and rate of detection of illegal activities by enabling the system to perform real-time detection. This is because the trained machine-learning model may perform detection of user activities in real time and trigger a remedial solution (e.g., immediate stoppage of the live stream and/or termination of access to the platform itself). Moreover, as will be further described herein with reference to FIG. 1, piracy monitoring system 100 may be configured to better detect illegal activities based on detecting and correlating certain user and account data. For example, when piracy monitoring system 100 detects an illegal activity, all information associated with the user access (e.g., user credentials, IP address, etc.) may be stored in a storage log. Thereafter, the trained machine-learning model may leverage this information to perform a nearest neighbor algorithm (e.g., a KNN learning classifier) for predicting possible streaming activity profiles that may be flagged earlier on. For example, it can be appreciated that hacking organizations may utilize a series of related IP addresses or operate out of specific geographic locations. Accordingly, piracy monitoring system 100 may be able to flag a potentially illegal streaming activity much earlier in the streaming process, thereby reducing the platform's exposure to piracy activities and better safeguarding copyrighted content.

Although the subject matter disclosed herein is generally described with reference to streamed live broadcasts, it is important to note that these designations are not limiting. More particularly, some or all of the embodiments that are subsequently described may be applicable to other types of digital media piracy.

FIG. 1 depicts an exemplary environment of a piracy monitoring system 100 configured to monitor and mitigate piracy events in substantially real-time, according to one or more embodiments of the present disclosure. The exemplary piracy monitoring system 100 may include an entitlement infrastructure module 105, a user token generation module 110, a user database 115, a user computing device 120, one or more content delivery networks (CDNs) 125 (A-C), a log collector module 130, a log storage module 135, a log normalization and processing module 140, a machine-learning infrastructure module 145, a machine-learning library 150, and alert and monitoring module 155, a deny list module 160, an operator computing device 165, and a network 165 (not illustrated) that may connect all or a subset of the foregoing components of the exemplary system environment.

In an embodiment, new users may subscribe to a DMCP via the entitlement infrastructure module 105. More particularly, users may become subscribers to a media-streaming service owned by a DMCP via registration through the DMCP's digital media platform (e.g., website, application, etc.). During registration, a new user may be required to provide one or more pieces of user information, such as: identifying information (e.g., name, age, physical address, IP address, etc.), content preference information (e.g., types of digital media content a user enjoys viewing, etc.), and/or billing information (e.g., credit card information, etc.). Upon successful registration, each user may be assigned a unique user token by user token generation module 110. In an embodiment, the user token may be, for example, a tracking token. Such a token may be a dynamically generated variable (e.g., an alphanumeric string of characters) that is configured to monitor and track the activity (e.g., download and consumption activity, etc.) of digital video content streamed by a user. In an embodiment, information associated with each user may be stored in the user database 115. More particularly, the user database 115 may contain the user information along with the unique token assigned to the user.

In an embodiment, infrastructure of the piracy monitoring system 100 may receive an indication to transmit an article of digital video content to a user computing device 120 associated with the user. In an embodiment the user computing device 120 may be virtually any device configured to receive and play digital media content (e.g., a laptop or desktop computer, a mobile device, a tablet, etc.). In an embodiment, the indication to transmit may correspond to identification of a user selection, on the digital media platform, to view a particular article of video content (e.g., a movie, a television show, a live media-stream, etc.). Upon receiving the transmission indication, the DMCP may transmit, to the user computing device 120, a video URL associated with the selected video content along with the user token.

In an embodiment, the user token may be tied to the video URL and may be utilized to track the user and various types of activity information associated with the video stream. For instance, the user token may be utilized to track the time or times at which the video was streamed, the device or devices streaming the video, the location or locations from which the video was streaming, and the like. In an embodiment, the tracking activities may be substantially continuous or, alternatively, may occur in response to detection of predetermined events. For instance, the user token may be configured to begin tracking upon detecting that a video stream has been initiated, upon detecting that a digital media platform has been activated, etc. In an embodiment, this tracked information associated with the token may be stored in one or more logs. In an embodiment, because the user token is tied to the video URL, if the initial video stream is rebroadcast, e.g., by the user computing device 120 to one or more other devices, activity information associated with those rebroadcasted streams is still tracked by the user token.

One or more CDNs 125 (A-C) may be configured to retrieve the logs of tracked information associated with the user token. In the context of this application, each CDN may be a geographically distributed network of proxy servers of the DMCP and their associated data centers. In an embodiment, the CDNs 125(A-C) utilized to retrieve the tracked information may be those that are geographically nearest to the user and/or the recipients of the rebroadcasted stream. In an embodiment, this retrieval may be conducted periodically at predetermined intervals (e.g., each minute, 5 minutes, 30 minutes, 1 hour, etc.) or may be conducted substantially continuously.

The collective logs from each relevant CDN 125(A-C) may be transmitted, via the network 165, to a log collector module 130 associated with the piracy monitoring system 100. In an embodiment, the collective logs may be transmitted by the CDN 125(A-C) to the log collector module 130 automatically (e.g., upon receipt at the CDN) or, alternatively, upon receipt of an operator command to transmit. In an embodiment, the log collector module 130 may be configured to store some or all of the received logs in a log storage module 135, which may be composed of one or more computing devices. The log data stored in the log storage module 135 may be raw data that has not been processed, cleaned, and/or analyzed.

Prior to introduction to a machine-learning infrastructure module 145, the raw log data may be accessed from the log storage module 135 and may be processed and normalized (e.g., via one or more processors, etc.) at a log normalization and processing module 140. As used herein, the term "normalize" may refer to the transformation of a value or a set of values to a common frame of reference for comparison purposes. In this regard, one or more normalization algorithms or techniques (e.g., min-max normalization, z-score normalization, decimal scaling, logarithmic transformation, root transformation, etc.) may be leveraged to bring all attributes in the logs onto the same scale. Such a process may correspondingly improve the performance of the machine-learning infrastructure module 145 by reducing the impact of any outliers and by improving the accuracy of a trained machine-learning model associated therewith.

In an embodiment, the normalized log data may be provided as input features to a trained machine-learning model of the machine-learning infrastructure module 145. As used herein, a "machine-learning model" generally encompasses instructions, data, and/or a model configured to receive input, and apply one or more of a weight, bias, classification, or analysis on the input to generate an output. The output may include, for example, an analysis based on the input, a prediction, suggestion, or recommendation associated with the input, a dynamic action performed by a system, or any other suitable type of output. A machine-learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine-learning model may operate on an input linearly, in parallel, via a network (e.g., a neural network), or via any suitable configuration.

In an embodiment, additional data may be used to further train or enhance the machine-learning model. For example, in order for piracy monitoring system 100 to better predict a risk level associated with an account (e.g., token), piracy monitoring system 100 may use already tracked token data as additional inputs into the machine-learning model. In one example, in an event where a piracy activity is detected, the token information and associated tracked data may also be used to further train the machine learning model. In this regard, the machine-learning model can use data associated with tracked piracy events, e.g., user account information, payment information, IP address information, user behavioral information, etc., to update one or more cost functions.

In an embodiment, feeding tracked token data back to the machine-learning model provides several advantages. Initially, it improves the detection accuracy of the system. For example, the machine-learning model can be better equipped to recognize a wider array of scenarios that may fall under a piracy activity because it is taught to recognize a wider array of scenarios that is constantly evolving. This, in turn, reduces the detection of false positive events (legitimate events that may be erroneously classified as piracy events), which also leads to improved user experiences (e.g., less undesired interruptions). Moreover, the use of tracked token data in the machine-learning model may also enable predictive detection for the system, thereby improving the real-time detection capabilities of the system. For example, instead of waiting for one or more triggering behaviors associated with a streaming service to be triggered (e.g., a streaming duration of longer than a predetermined time period) before the system starts to analyze a potentially illegal activity, piracy monitoring system 100 may be configured to classify a streaming activity as potentially illegal at a much earlier stage. That is because the machine-learning model, using previously tracked token data as an input, can enable the system to use pattern recognition to formulate a piracy classification, with an increasing degree of confidence, based on one or more data associated with an initiated stream. For example, the machine-learning model may be trained to perform nearest neighbor searches to recognize certain patterns in piracy activities (e.g., majority of piracy activities for certain live events that are streamed in a certain region originate from a specific jurisdiction or city, or country, etc.) As such, piracy monitoring system 100 may trigger a monitoring service to monitor a suspected streaming activity based on one or more parameters associated with an account associated with the streaming activity at the time the streaming activity is requested. This can yield to improved real-time detection of piracy activities.

The execution of the machine-learning model may include deployment of one or more machine-learning techniques, such as k-nearest neighbors, linear regression, logistical regression, random forest, gradient boosted machine (GBM), support-vector machine, deep learning, a deep neural network, and/or any other suitable machine-learning technique that solves problems in the field of Natural Language Processing (NLP). Supervised, semi-supervised, and/or unsupervised training may be employed. For example, supervised learning may include providing training data and labels corresponding to the training data, e.g., as ground truth. Unsupervised approaches may include clustering, classification, or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

Figure 2:
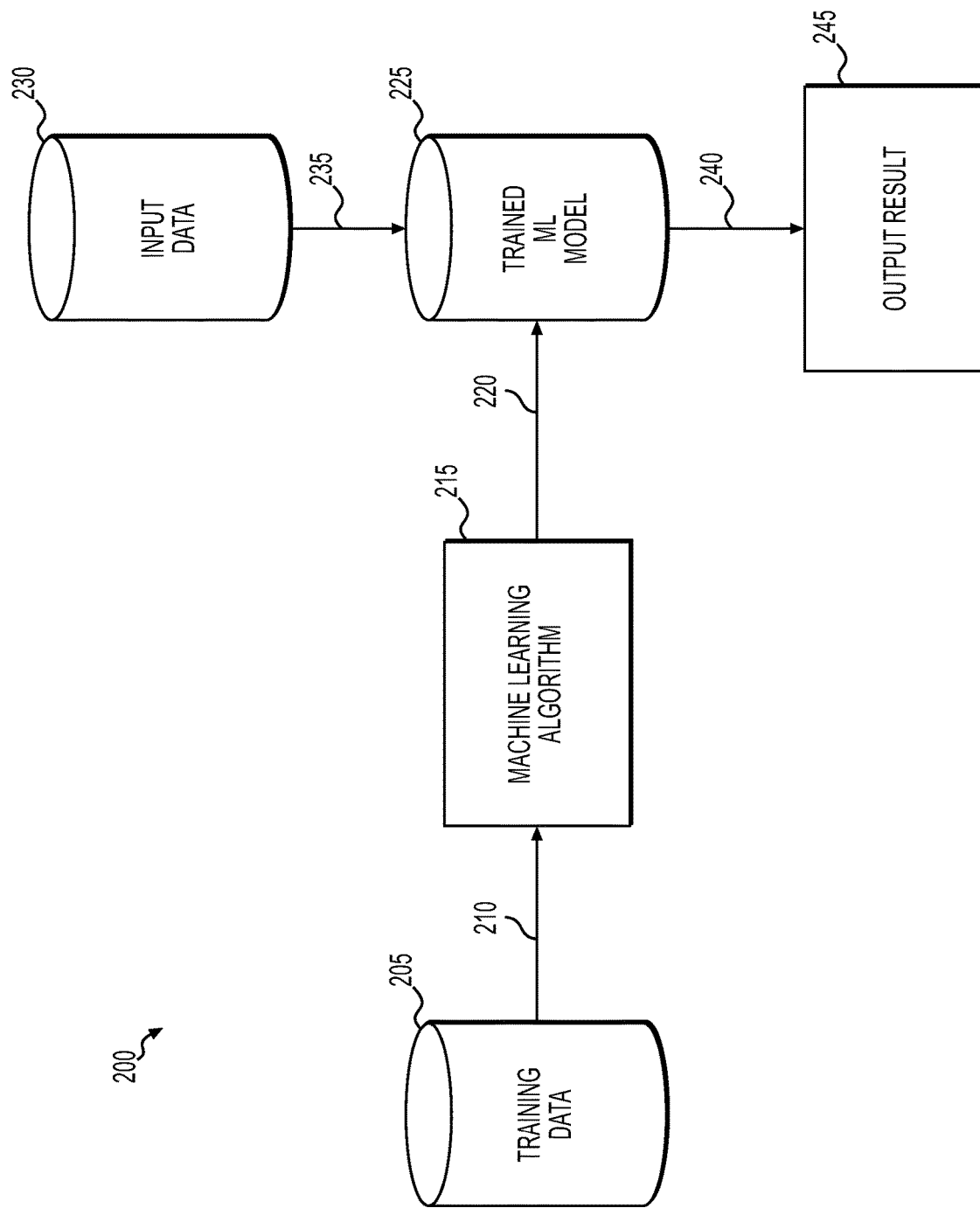
FIG. 2 depicts an exemplary flow diagram for training and deploying a machine-learning model, according to one or more embodiments of the present disclosure.

FIG. 2 depicts a flow diagram 200 of an exemplary process for training and deploying the machine-learning model of the machine-learning infrastructure module 145 via a supervised learning process. In an embodiment, training data 205 for the machine-learning model may first be obtained (e.g., from a machine-learning library 150 as depicted in FIG. 1). The training data 205 may be composed of the normalized log data labeled with particular outputs. For example, a first article of streaming usage data may be labeled as normal traffic whereas a second article of streaming usage data, having a value significantly higher than the first article of streaming usage data, may be labeled as likely piracy. The training data 205 may thereafter may be applied, at step 210, to a machine-learning algorithm 215 to train an untrained machine-learning model to recognize the patterns of streaming traffic associated with normal streaming behavior versus the patterns of streaming traffic associated with likely piracy behavior. Patterns associated with likely piracy behavior may include, but are not limited to, those that represent: too much traffic from the same user, too much traffic at the same time, traffic from users that are in a time zone not compatible with the service offering, traffic from users that are in countries not compatible with the service, and the like. This training phase may ultimately generate, at step 220, a trained machine-learning model that may thereafter receive, at step 235, input data 230. Here, the input data 230 may correspond to the normalized log data that was obtained by the log collector module 135 and processed and normalized at the log normalization and processing module 140. The trained machine-learning model 225 may process the input data 230 to generate, at 240, an output result 245 corresponding to a determination of normal streaming behavior or piratic streaming behavior.

Referring again to FIG. 1, a likely piracy determination received from the machine-learning infrastructure module 145 may be transmitted to one or both of an alert and monitoring module 155 and/or a deny list module 160. With respect to the former, the alert and monitoring module 155 may be configured to transmit an alert notification to one or more operator computing devices 165. The alert notification may: inform an operator that piracy of digital media content may be occurring, provide an indication of a user-subscriber responsible for the piracy, and/or provide a listing of options that the can be taken to mitigate the piracy. With respect to the latter, upon receiving an indication of likely piracy, the user profile associated with the user-subscriber responsible for the piracy may be placed on a "deny list", thereby preventing the user from being able to continue streaming the video article and/or other additional content on the digital media platform.

Referring now to FIG. 3, a flowchart is illustrated of an exemplary method 300 of performing digital media piracy monitoring, according to one or more aspects of the present disclosure. Exemplary process flows of the method 300, performed in accordance with the piracy monitoring system 100 above, and with additional reference to the illustration provided in FIG. 2, are described hereinafter.

At step 305, a piracy monitoring system 100 may detect a request to transmit a video stream to a user computing device associated with a user. In an embodiment, the user may be a subscriber to a digital media platform associated with a DMCP and the request may be a selection by the user-subscriber to view an article of digital media content (e.g., a live video stream, etc.).

Responsive to receiving the selection, at step 305, the piracy monitoring system 100 may transmit, at step 310, the video stream to a user computing device 120 associated with the user. In an embodiment, the user computing device 120 may be any computing device that supports the digital media platform and on which the user is logged into a verified user account associated with the digital media platform. In an embodiment, transmission of the video stream to the user computing device 120 may involve transmitting a video URL that contains the video stream. The video URL may be tagged with a unique token—generated upon successful user registration with the digital media platform—that is linked to the user. The token may be configured to track and record various activity associated with the provided video stream. Types of streaming activity that may be tracked by the token include video consumption time, volume, and/or location.

At step 315, the piracy monitoring system 100 may retrieve activity data associated with the video stream. In this regard, one or more CDNs 125(A-C) may be configured to retrieve, from the tracking token, the tracked activity data of the video stream. In an embodiment, the CDNs that are utilized to perform the data retrieval may be those that are geographically proximate to the user computing device. Once received, the streaming activity data may be compiled into one or more activity data logs and provided, at step 320, to a machine-learning infrastructure module 145 containing a trained machine-learning model (e.g., such as the machine-learning model 200 illustrated in FIG. 2). In furtherance of this provision, the activity data logs may be transmitted from the CDNs 125(A-C) to a log collector 130 and thereafter normalized (e.g., by one or more processors of a log normalization and processing module 140 associated with the piracy monitoring system 100) prior to application to the machine-learning model.

In an embodiment, the machine-learning model of the machine-learning infrastructure module 145 may be configured to recognize one or more video piracy patterns that may imply unauthorized rebroadcasting of the video stream to one or more other individuals. For example, the machine-learning model may be configured to recognize an excessive user-consumption pattern in which the activity data indicates abnormally high consumption of the video stream from the single user. In this regard, a threshold level of normal video streaming consumption may be established and streaming activity measured above this threshold may be considered piratic activity. In another example, the machine-learning model may be configured to recognize an excessive temporal consumption pattern in which the activity data indicates that the video stream is being streamed too many times substantially simultaneously. Similar to the foregoing, the piracy monitoring system 100 may identify whether the tracked streaming activity is greater than a threshold level of normal video streaming consumption for any given time period. In yet another example, the machine-learning model may be configured to recognize an incompatible time zone consumption pattern and/or an incompatible geographical location consumption pattern. In this regard, the piracy monitoring system 100 may identify whether the video stream is being viewed in an incompatible time zone (e.g., the streaming activity indicates that a live United States east coast broadcast is being prematurely viewed on the west coast ahead of its scheduled west coast broadcast time, etc.) or an incompatible country (e.g., the streaming activity indicates that a live broadcast is being viewed in a country where the digital media platform is not supported).

Responsive to receiving, at step 325, an output result from the trained machine-learning model indicating that the activity data logs are not indicative of a video piracy pattern, the piracy monitoring system 100 may, at step 330, take no additional action. Conversely, responsive to receiving, at step 325, an output result from the trained machine-learning model indicating that the activity logs are indicative of a video piracy pattern, the piracy monitoring system 100 may, at step 335, perform one or more mitigating action to address the piracy.

In one example, the piracy monitoring system 100 may leverage an associated alert and monitoring module 155 to transmit an alert notification to an operator associated with the piracy monitoring system. In this regard, the alert notification may be transmitted to one or more known computing devices 165 associated with the operator. In an embodiment, the alert notification may provide an indication to the operator of at least one of: the output result (i.e., that piracy was detected), a user profile associated with the piracy, and/or a listing of one or more actions the operator can take to mitigate the piracy (e.g., authorities and/or supervisors the operator can contact, steps the operator can take to block the video stream, steps the operator can take to prevent steam piracy moving forward, etc.).

In another example, the piracy monitoring system 100 may execute a streaming block on the user. In this regard, the streaming block may prevent the video stream, and any other video streams hosted by the digital media platform, from further being transmitted to any user computing device 120 on which the user is logged into the digital media platform on. In an embodiment, the streaming block may be executed automatically (e.g., upon receiving the output result at step 325) or, alternatively, may be executed upon receiving an explicit user command to block (e.g., a command from a notified operator of the piracy monitoring system 100). In an embodiment, the length of the streaming block ban on the user account may be based on one or more factors. For instance, in one example, the user account may be permanently banned from streaming and/or accessing digital media content on the digital media platform after a single offense. Alternatively, in another example, the streaming block may be temporary and may be based on a number of prior piracy offenses (e.g., a user account having one offense may correspond to a streaming ban of one month, a user account having two offenses may correspond to a streaming ban of six months, a user account having three offenses may correspond to a streaming ban of 1 year, etc.). Additionally or alternatively to the foregoing, in yet another example, the length of the streaming block ban may be based on a degree of the piracy event. For instance, the length of the streaming ban may be less if the activity data logs indicate that the user-subscriber was rebroadcasting the video stream to only a few other individuals as opposed to rebroadcasting the video stream to a mass amount of individuals.

In general, any process discussed in this disclosure that is understood to be computer-implementable, such as the process illustrated in FIG. 3, may be performed by one or more processors of a computer system, such as computer system 100, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer server. A processor may be a central processing unit (CPU), a graphics processing unit (GPU), or any suitable types of processing unit.

A computer system, such as piracy monitoring computer server 100, may include one or more computing devices. If the one or more processors of the computer system are implemented as a plurality of processors, the plurality of processors may be included in a single computing device or distributed among a plurality of computing devices. If a computer system 100 comprises a plurality of computing devices, the memory of the computer system 100 may include the respective memory of each computing device of the plurality of computing devices.

FIG. 4 is a simplified functional block diagram of a computer system 400 that may be configured as a computing device for executing the process illustrated in FIG. 3, according to exemplary embodiments of the present disclosure. FIG. 4 is a simplified functional block diagram of a computer that may be configured as the piracy monitoring computer system 100 according to exemplary embodiments of the present disclosure. In various embodiments, any of the systems herein may be an assembly of hardware including, for example, a data communication interface 420 for packet data communication. The platform also may include a central processing unit ("CPU") 402, in the form of one or more processors, for executing program instructions. The platform may include an internal communication bus 408, and a storage unit 406 (such as ROM, HDD, SDD, etc.) that may store data on a computer readable medium 422, although the system 400 may receive programming and data via network communications. The system 400 may also have a memory 404 (such as RAM) storing instructions 424 for executing techniques presented herein, although the instructions 424 may be stored temporarily or permanently within other modules of system 400 (e.g., processor 402 and/or computer readable medium 422). The system 400 also may include input and output ports 412 and/or a display 410 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to: the process shown in FIG. 12, and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method of performing digital media piracy monitoring, the computer-implemented method comprising operations including:

detecting, at a digital media platform associated with a piracy monitoring system, a request to transmit a video stream to a user computing device associated with a user;

transmitting the video stream to the user computing device responsive to determining that the user is a subscriber to the digital media platform, wherein the transmitting the video stream comprises transmitting to the user computing device a video URL identifying the video stream, wherein the video URL is tagged with a token that is linked to the user and configured to track activity of the video stream;

retrieving, from the token, activity data associated with the video stream using a content delivery network (CDN) associated with the piracy monitoring system, wherein the activity data is derived from one or more access logs that are correlated to use of the token identifying the video stream;

providing, responsive to the retrieving, the activity data to a trained machine-learning model configured to recognize a video piracy pattern, wherein the video piracy pattern corresponds to an identification that the video stream is being consumed from a time zone that is different than a designated time zone, wherein the time zone is determined based on geographic data extracted from the one or more access logs; and performing a mitigating action to address piracy of the video stream responsive to receiving an output result from the trained machine-learning model indicating that activity data shares a predetermined level of similarity with the video piracy pattern.

2. The computer-implemented method of claim 1, further comprising:

compiling the retrieved activity data in an activity data log at the CDN;

transmitting the activity data log from the CDN to a log collector component of the piracy monitoring system; and normalizing, prior to the providing and using a processor associated with the piracy monitoring system, the activity data log.

3. The computer-implemented method of claim 1, wherein the video piracy pattern corresponds to at least one of: an excessive user-consumption pattern, an excessive temporal consumption pattern and an incompatible geographical location consumption pattern.

4. The computer-implemented method of claim 1, wherein the performing the mitigating action comprises transmitting an alert notification to an operator associated with the piracy monitoring system.

5. The computer-implemented method of claim 4, wherein the alert notification provides an indication of at least one of: the output result, a user profile associated with the user, and an action recommendation based on the output result.

6. The computer-implemented method of claim 1, wherein the performing the mitigating action comprises instituting a streaming block on the user, wherein the streaming block prevents the video stream from being transmitted to the user computing device.

7. The computer-implemented method of claim 6, wherein a length of the streaming block is based on a degree of the piracy indicated in the output result.

8. The computer-implemented method of claim 6, wherein the instituting of the streaming block comprises automatically instituting the streaming block, without additional user input, upon receiving the output result.

9. The computer-implemented method of claim 6, wherein a length of the streaming block is based on a number of prior piracy offenses.

10. The computer-implemented method of claim 1, wherein the CDN comprises a plurality of CDNs positioned proximate to the user computing device.

11. A computer system for performing digital media piracy monitoring, the computer system comprising:
a processor;
a database; and
a server in network communication with the database, the server configured to perform operations including:

detecting, at a digital media platform associated with the computer system, a request to transmit a video stream to a user computing device associated with a user;

transmitting the video stream to the user computing device responsive to determining that the user is a subscriber to the digital media platform, wherein the transmitting the video stream comprises transmitting to the user computing device a video URL identifying the video stream, wherein the video URL is tagged with a token that is linked to the user and configured to track activity of the video stream;

retrieving, from the token, activity data associated with the video stream using a content delivery network (CDN) associated with the computer system, wherein the activity data is derived from one or more access logs that are correlated to use of the token identifying the video stream;

providing, responsive to the retrieving, the activity data to a trained machine-learning model configured to recognize a video piracy pattern, wherein the video piracy pattern corresponds to an identification that the video stream is being consumed in a time zone that is different than a designated time zone, wherein the time zone is determined based on geographic data extracted from the one or more access logs; and performing a mitigating action to address piracy of the video stream responsive to receiving an output result from the trained machine-learning model indicating that activity data shares a predetermined level of similarity with the video piracy pattern.

12. The computer system of claim 11, further comprising:
compiling the retrieved activity data in an activity data log at the CDN;

transmitting the activity data log from the CDN to a log collector component of the computer system; and normalizing, prior to the providing and using a processor associated with the computer system, the activity data log.

13. The computer system of claim 11, wherein the video piracy pattern corresponds to at least one of: an excessive user-consumption pattern, an excessive temporal consumption pattern, and an incompatible geographical location consumption pattern.

14. The computer system of claim 11, wherein the performing the mitigating action comprises transmitting an alert notification to an operator associated with the computer system.

15. The computer system of claim 11, wherein the performing the mitigating action comprises instituting a streaming block on the user, wherein the streaming block prevents the video stream from being transmitted to the user computing device.

16. The computer system of claim 15, wherein a length of the streaming block is based on a degree of the piracy indicated in the output result.

17. The computer system of claim 15, wherein the instituting of the streaming block comprises automatically instituting the streaming block, without additional user input, upon receiving the output result.

18. The computer system of claim 15, wherein a length of the streaming block is based on a number of prior piracy offenses.

19. The computer system of claim 11, wherein the CDN comprises a plurality of CDNs positioned proximate to the user computing device.

20. A non-transitory computer-readable medium storing computer-executable instructions which, when executed by a server in network communication with at least one database, cause the server to perform operations comprising:
    detecting, at a digital media platform associated with a piracy monitoring system, a request to transmit a video stream to a user computing device associated with a user;
    transmitting the video stream to the user computing device responsive to determining that the user is a subscriber to the digital media platform, wherein the transmitting the video stream comprises transmitting to the user computing device a video URL identifying the video stream, wherein the video URL is tagged with a token that is linked to the user and configured to track activity of the video stream;
    retrieving, from the token, activity data associated with the video stream using a content delivery network (CDN) associated with the piracy monitoring system, wherein the activity data is derived from one or more access logs that are correlated to use of the token identifying the video stream;
    providing, responsive to the retrieving, the activity data to a trained machine-learning model configured to recognize a video piracy pattern, wherein the video piracy pattern corresponds to an identification that the video stream is being consumed in a time zone that is different than a designated time zone, wherein the time zone is determined based on geographic data extracted from the one or more access logs; and
    performing a mitigating action to address piracy of the video stream responsive to receiving an output result from the trained machine-learning model indicating that activity data shares a predetermined level of similarity with the video piracy pattern.

* * * * *